July 2, 1929.　　　　J. NOVAK　　　1,719,669
POTATO LOADER AND CUTTER
Filed July 11, 1923　　5 Sheets-Sheet 1
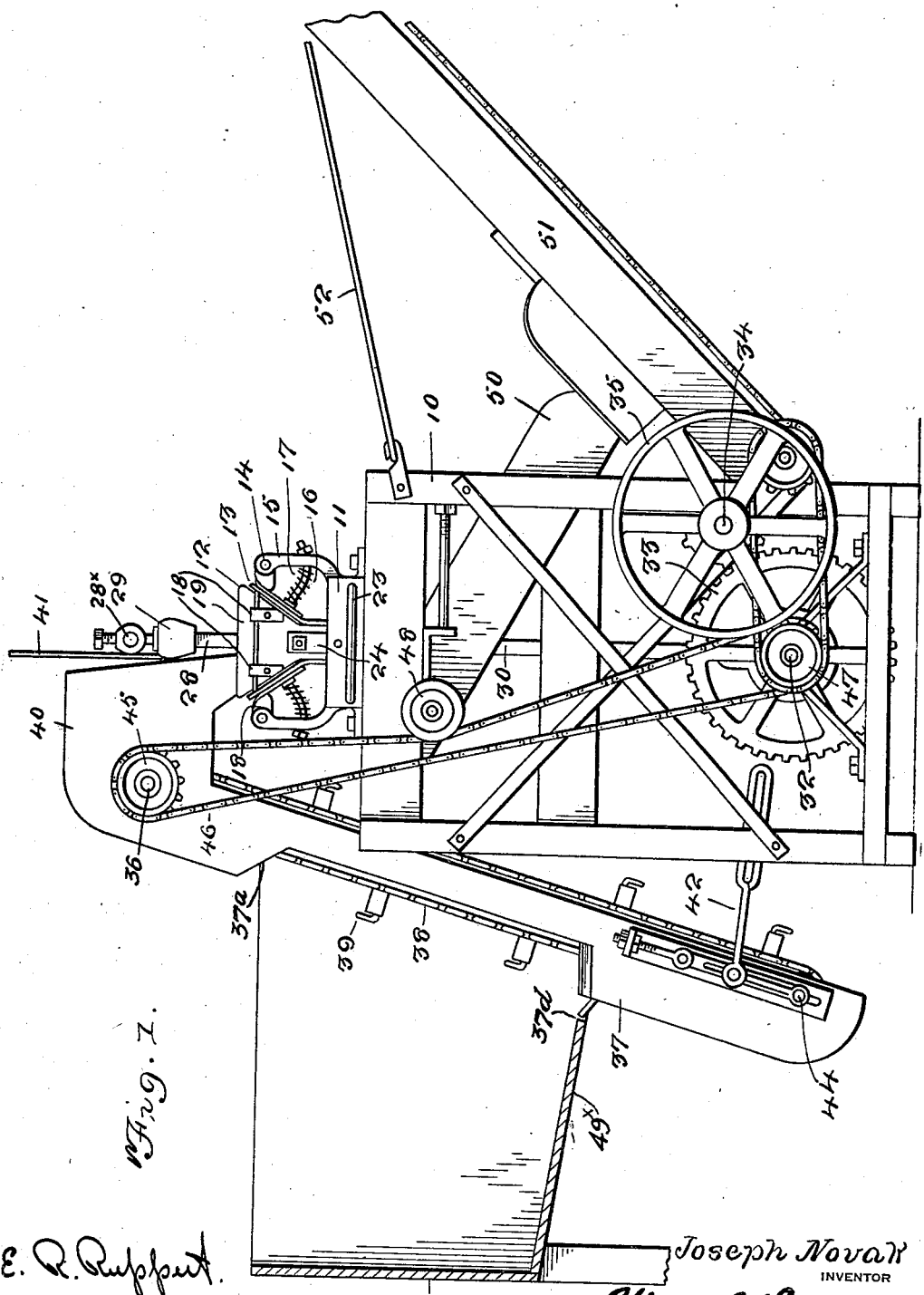

July 2, 1929.　　　　　J. NOVAK　　　　　1,719,669
POTATO LOADER AND CUTTER
Filed July 11, 1923　　　5 Sheets-Sheet 2
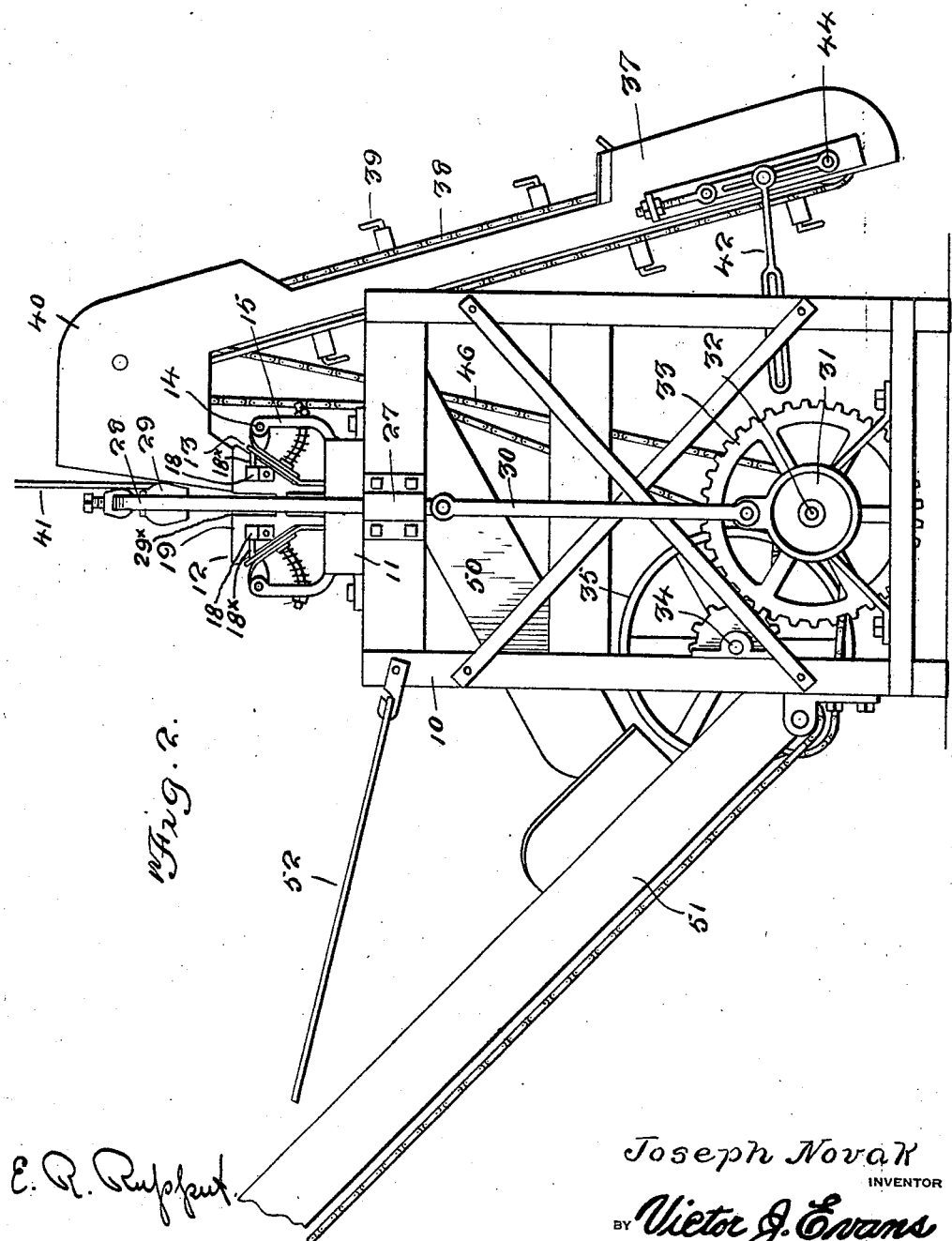

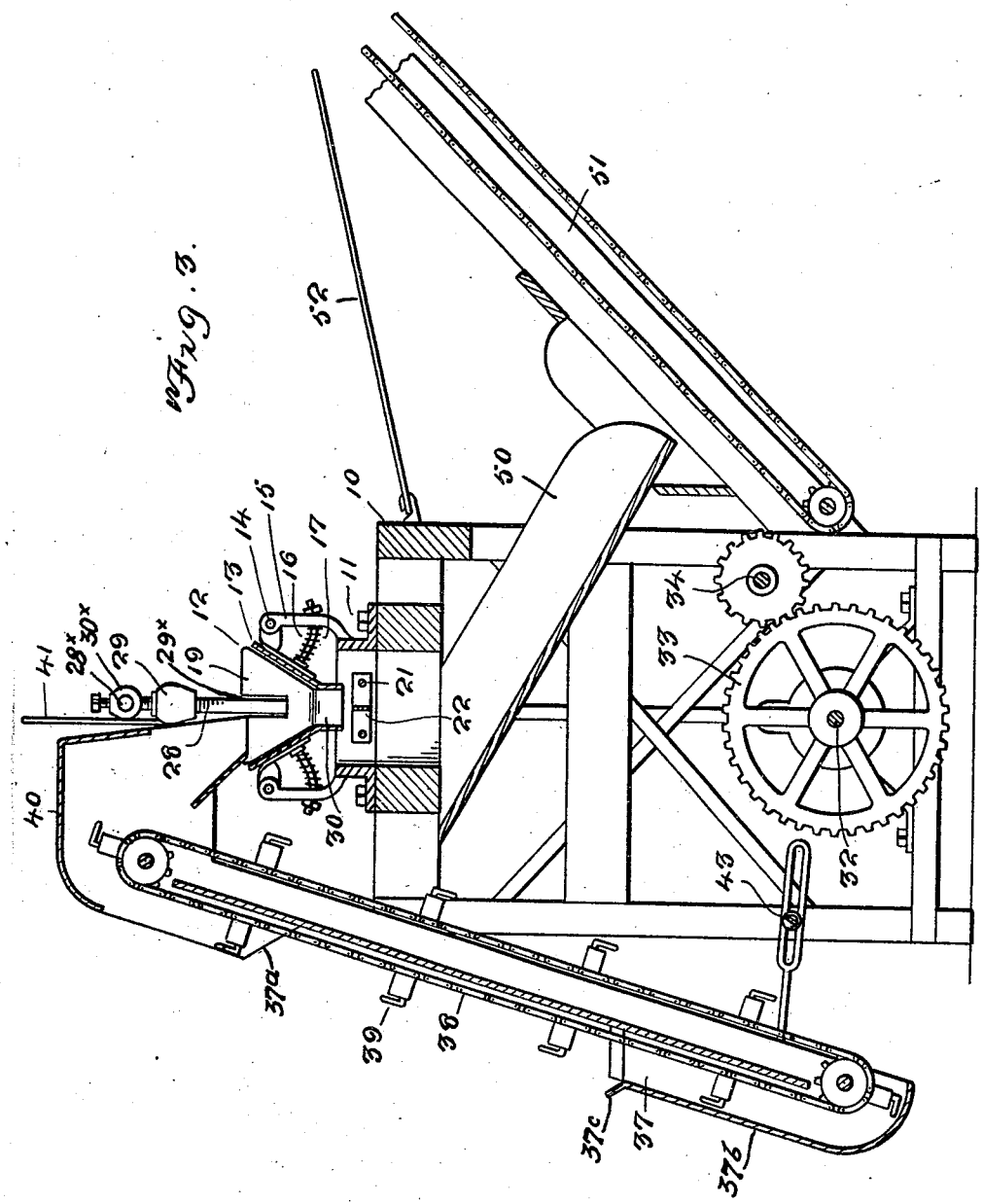

July 2, 1929.　　　J. NOVAK　　　1,719,669
POTATO LOADER AND CUTTER
Filed July 11, 1923　　　5 Sheets-Sheet 4
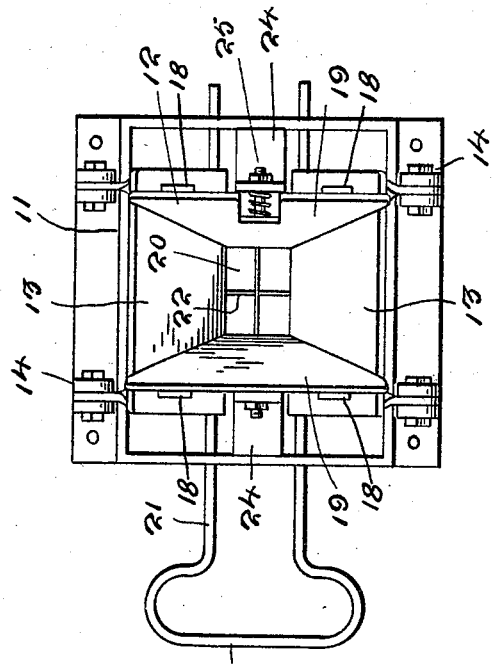
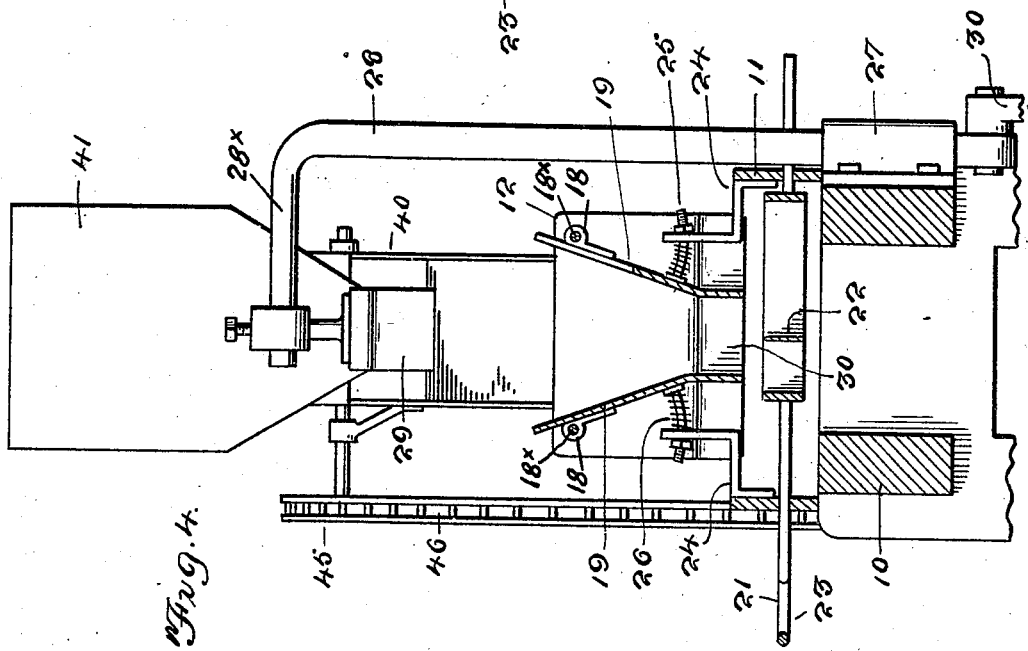
Joseph Novak
INVENTOR
BY Victor J. Evans
ATTORNEY
WITNESS:
E. Q. Ruppert.

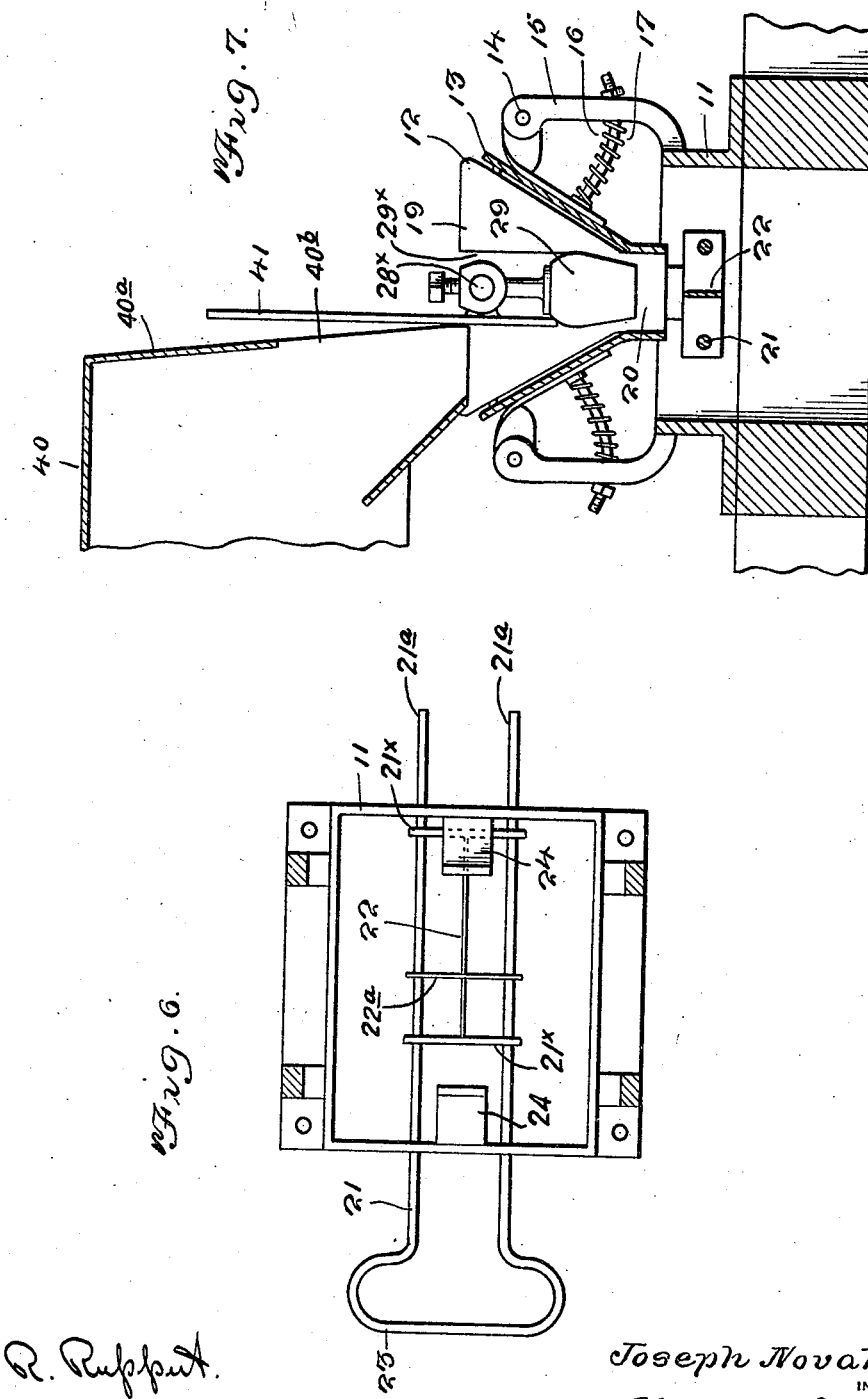

Patented July 2, 1929.

1,719,669

UNITED STATES PATENT OFFICE.

JOSEPH NOVAK, OF LAKE PRESTON, SOUTH DAKOTA.

POTATO LOADER AND CUTTER.

Application filed July 11, 1923. Serial No. 650,949.

This invention relates to improvements in cutting machines and has for an object the provision of a combined cutter and loader especially designed for cutting potatoes and loading them into a truck body or other container.

Another object of the invention is the provision of a machine of this character which includes a novel knife arrangement whereby the latter may be adjusted to cut potatoes into two or more parts.

Another object of the invention is the provision of a novel construction of hopper for directing the potatoes to the knives, together with means for forcing the potatoes through the hopper past the knives.

Another object of the invention is the provision of a combination machine which includes cutting means, means for feeding the potatoes thereto and means for loading the potatoes as above mentioned.

With the above and other objects in view, the invention further includes the following novel features and details of construction, to be hereinafter more fully described, illustrated in the accompanying drawings and pointed out in the appended claims.

In the drawings:—

Figure 1 is a side elevation of a machine constructed in accordance with the invention, the container from which the potatoes are fed to the machine being shown in section.

Figure 2 is a similar view looking at the opposite side of the machine with the container removed.

Figure 3 is a longitudinal vertical sectional view.

Figure 4 is a vertical cross section through the hopper.

Figure 5 is an enlarged plan of the hopper.

Figure 6 is a sectional view in a plane parallel to Figure 5.

Figure 7 is a fragmentary vertical longitudinal section of an important sub-combination hereinafter explicitly referred to.

Referring to the drawings in detail wherein like characters of reference denote corresponding parts, the reference character 10 indicates the main frame of the machine upon the top of which is mounted what may be termed a hopper frame 11, the last mentioned frame supporting a hopper 12.

This hopper includes inclined side walls 13 which are hingedly mounted as at 14 upon the upper ends of arms 15 which are carried by the hopper frame 11. Extending from the inclined side walls 13 are curved arms 16 which pass through the arms 15 and have mounted thereon coiled springs 17 which act to yieldingly force the lower ends of the walls 13 inward.

Swingably arranged between the inclined side walls 13 are inclined end walls 19, the arrangement of the walls 19 and 13 providing a restricted opening 20 in the bottom of the hopper for the passage of potatoes or the like therethrough. Apertured lugs 18 are carried at the outer sides of the walls 19, Figures 1, 2 and 4, and in said lugs 18 are disposed pintles $18^x$ carried by the upper portions of the walls 13.

Slidingly mounted in the hopper frame 11 is a rectilinearly-movable knife frame 21.

In addition to providing a guide for the knife frame 21, the hopper frame 11 also carries angle brackets 24 and secured to the end walls 19 of the hopper and extending through openings provided in these angle brackets are curved arms 25 which are surrounded by coiled springs 26. These springs together with the springs 17 act to force the lower end of portions of all of the inclined walls of the hopper inward and will yield to permit of the passage of potatoes therethrough.

Mounted upon one side of the machine and operating through a guide 27 is a substantially L-shaped member 28 which carries at one end a plunger 29 which is adapted to operate within the hopper 12 to force the potatoes therethrough and past the blades of the knife. A horizontal arm $28^x$ at the upper end of the member 28 is adapted to play vertically in an opening $29^x$ in one of the hopper walls 19, and the plunger 29 has an apertured shank $30^x$ which receives the arm $28^x$ and is adjustably fixed thereto by a set screw $31^x$. At its opposite end, the L-shaped member 28 has pivotally secured thereto one end of a pitman 30, while the opposite end of this pitman is pivotally secured to an eccentric 31, the latter being mounted upon a shaft 32 having bearings in the frame 10. The shaft 32 is driven through suitable gearing 33 from a shaft 34 and this last mentioned shaft has mounted thereon fast and loose pulleys 35 for connection with a suitable source of power.

The knife frame 21 before alluded to has spaced bars $21^a$ in parallelism, movable and guided in opposite bars of the frame 11, and also has an end handle loop 23 joined to adjacent ends of the parallel bars 21ª, and spaced cross bars 21ˣ interposed between and fixed to and movable with the said parallel bars. Interposed between and carried by said cross bars 21ˣ is a longitudinal central knife 22, and carried by and fixed to the parallel knife frame bars 21ª is a cross knife 22ª which is preferably joined to the knife 22 and is arranged nearer one of the cross bars 21ˣ than the other. Manifestly when the crossed knives 22 and 22ª are arranged in vertical coincidence with the discharge of the hopper and the plunger 29 and a potato is forced by the plunger down upon the crossed knives the potato will be cut into four pieces. When, however, the loop 23 is grasped and the frame 21 is pulled outwardly to position the portion of the knife 22 at the right of the knife 22ª alone under and in vertical coincidence with the discharge of the hopper and the plunger 29 and a potato is forced downwardly by the said plunger, the potato will be cut into two pieces and this by the knife 22 alone. It will also be appreciated in this connection that rectilinear movement of the frame 21 is all that is necessary to change the cutting means for the purpose indicated.

Pivotally mounted in the main frame 10 as shown at 36 is the frame 37 of an elevating and feeding conveyor 38, the latter including buckets or cups 39 which are adapted to receive and carry the potatoes upwardly and discharge same into the hopper 12. The upper end of the frame 37 of the conveyor is provided with a hood or bonnet 40 which is adapted to direct the potatoes downwardly into the hopper, while the plunger 29 carries a reciprocatory shield 41 which prevents the potatoes from rolling over the hopper. The hood or bonnet 40 has its forward wall 40ª discontinued above its discharge end, Figure 7, to afford a forward opening 40ᵇ, and the shield or plate 41 arranged and reciprocable opposite and adjacent said opening is adapted to serve the additional function of facilitating the passage of potatoes from the hood 40 to the hopper, thereby averting choking. Pivotally secured to the lower end of the frame 37 of the conveyor are the outer ends of arms 42, the inner ends of these arms being provided with longitudinal slots and being adjustably secured to the main frame 10 as shown at 43 Figure 3. This provides for regulating the inclined position of the conveyor 38. The conveyor chain may be adjusted to regulate the tension and for this purpose the shaft which carries the lower sprocket wheels for the conveyor chain is mounted in adjustable bearings 44.

The shaft at the upper end of the conveyor 38 has secured thereon a sprocket wheel 45 which is driven by means of a chain 46 from a sprocket wheel 47 which is mounted upon the shaft 32, the tension of the chain 46 being regulated by a tensioning device 48.

The outer stretch of the conveyor 38 passes through a container 49 which is adapted to contain the potatoes to be cut and the buckets moving upward through this container will pick up and carry the potatoes to the hopper as previously mentioned.

By comparison of Figures 1 and 3, the conveyor frame 37 will be understood as recessed at 37ª to permit potatoes to freely pass from the container 49 to the buckets 39, and the said frame 37 will also be understood as having a lower casing portion 37ᵇ with a lip 37ª adapted to rest under that open bottom portion 37ᵈ of the container 49 immediately adjacent the open side of said container. Thus the openings at the side and bottom of the container 49 will be adequately closed by the elevating conveyor frame 37 and the passage of potatoes from the container 49, the bottom 49ˣ of which is inclined to the buckets 39 will be promoted as will the elevation of an adequate quantity of potatoes so long as the container 49 is supplied with potatoes.

Located beneath the knives 22 and 22ª is a discharge chute 50 which empties upon a loading conveyor 51 whose lower end is secured to the main frame 10. This conveyor 51 is inclined upwardly and outwardly, its angle of inclination being regulated by means of cables or chains 52 which connect the frame of the conveyor 51 with the main frame 10.

Thus after the potatoes have been cut they will pass downward through the discharge chute 50 upon the loading conveyor 51 and be carried upwardly and deposited into the body of a truck, or other container.

The invention is susceptible of various changes in its form, proportions and minor details of construction and the right is herein reserved to make such changes as properly fall within the scope of the appended claims.

Having described the invention what is claimed is:—

1. In combination, a horizontally-disposed open frame, a hopper supported above said frame and having a contracted discharge at its lower end, a vertically-reciprocable plunger in the hopper, rectilinearly-movable, spaced and parallel bars arranged and guided in opposite bars of said frame, a handle loop joining adjacent ends of said movable bars, spaced cross bars fixed to said rectilinearly-movable bars, a longitudinal central vertically-disposed knife interposed between and carried by said cross bars, and a cross-knife carried by said rectilinearly movable bars and arranged closer to one cross bar than the other, whereby either the intersecting portions of the knives or a portion of the longitudinal central knife, alone, may be arranged in vertical coincidence with the discharge of the hopper.

2. In combination, a horizontally disposed open frame, a hopper having a discharge, means for pressing products to be cut downwardly through said discharge, and horizontally adjustable cutting means supported by opposite portions of the frame and including crossed vertically-disposed knives adapted to be arranged in vertical coincidence with the discharge of the hopper; one knife being extended at opposite sides of the other in the line of adjustment of the cutting means, and the said knife being sufficiently long at one side of the other to permit of said knife alone to be arranged in vertical coincidence with the discharge of the hopper.

3. In combination, a hopper having a contracted discharge at its lower end, cutting means disposed below the hopper, a vertically-reciprocable plunger movable in the hopper in vertical coincidence with the contracted discharge therefrom, a pendent spout disposed above the hopper and open at its forward side, a vertically-reciprocable shield opposite and adjacent to said open side of the spout and connected and movable with the plunger, and means for supplying products to said spouts.

4. In combination, a hopper having a contracted discharge at its lower end, cutting means disposed below the hopper, a vertically-reciprocable plunger movable in the hopper in vertical coincidence with the contracted discharge therefrom, a pendent spout disposed above the hopper and open at its forward side, a vertically-reciprocable shield opposite and adjacent to said open side of the spout and connected and movable with the plunger, and means for supplying products to said spouts; one of the sides of the hopper having an opening in its upper portion, and a vertically-reciprocable member movable in a plane alongside that of the hopper and having a lateral arm connected with and adapted to carry said plunger and shield; said arm movable in said opening in the hopper side.

5. In a seed potato cutter, means adapted for supporting reception of potatoes of various sizes, one at a time, and a knife carriage reciprocable beneath said potato supporting means and having knives arranged to cut potatoes into various numbers of pieces according to the position at which the knife carriage is brought to rest beneath the potato supporting means.

6. In a seed potato cutter, means adapted for supporting reception of potatoes of various sizes, one at a time, a knife carriage reciprocable beneath said potato supporting means and having knives arranged to cut potatoes into various numbers of pieces according to the position at which the knife carriage is brought to rest beneath the potato supporting means, and a plunger operable for forcing each potato against a knife or knives of the knife carriage to effect cutting of the same.

7. In a seed potato cutter, means adapted for supporting reception of potatoes of various sizes, one at a time, a knife carriage reciprocable beneath said potato supporting means and having knives arranged to cut potatoes into various numbers of pieces according to the position at which the knife carriage is brought to rest beneath the potato supporting means, a plunger operable for forcing each potato against a knife or knives of the knife carriage to effect cutting of the same, and means to automatically center each potato in the path of the plunger when the latter is retracted.

8. In a seed potato cutter, a hopper adapted for reception of potatoes, one at a time, and a knife carriage reciprocable beneath the hopper and having knives arranged to cut potatoes into varying numbers of pieces according to the position at which the knife carriage is brought to rest beneath the hopper.

9. In a seed potato cutter, a hopper adapted for reception of potatoes, one at a time, a knife carriage reciprocable beneath the hopper and having knives arranged to cut potatoes into varying numbers of pieces according to the position at which the knife carriage is brought to rest beneath the hopper, and a plunger projectable for forcing the potato in the hopper against a knife or knives of the knife carriage to effect cutting of the same.

10. In a seed potato cutter, a hopper adapted for reception of the potatoes to be cut, one at a time, a knife carriage reciprocable beneath the hopper and having knives arranged to cut the potatoes into varying numbers of pieces according to the position at which said knife carriage is brought to rest beneath the hopper, said hopper embodying means to yieldingly hold the potato in an elevated position out of the path of movement of the knife carriage, and a plunger projectable for forcing the potato in the hopper against a knife or knives of the knife carriage to effect cutting of the same.

11. In a seed potato cutter, cutting mechanism including a plurality of sets of blades, each set consisting of a different number of blades, and means for selectively shifting the sets of blades into cutting position.

In testimony whereof I affix my signature.

JOSEPH NOVAK.